US006983331B1

(12) United States Patent
Mitchell et al.

(10) Patent No.: US 6,983,331 B1
(45) Date of Patent: Jan. 3, 2006

(54) SELECTIVE DISPLAY OF CONTENT

(75) Inventors: Syne Mitchell, North Bend, WA (US); G. Scott Tomlin, Bellevue, WA (US); Lori Niva, Issaquah, WA (US); Matthew J. Lindenburg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 09/691,277

(22) Filed: Oct. 17, 2000

(51) Int. Cl.
*G06F 15/16* (2006.01)
*G05F 15/00* (2006.01)

(52) U.S. Cl. ...................... 709/246; 709/203; 709/217; 715/513; 715/517

(58) Field of Classification Search ................ 709/217, 709/203, 246; 715/513, 517
See application file for complete search history.

(56) References Cited

U.S. PATENT DOCUMENTS

| | | | | |
|---|---|---|---|---|
| 6,023,714 | A * | 2/2000 | Hill et al. | 715/513 |
| 6,098,085 | A * | 8/2000 | Blonder et al. | 715/513 |
| 6,098,096 | A * | 8/2000 | Tsirigotis et al. | 709/213 |
| 6,237,030 | B1 * | 5/2001 | Adams et al. | 709/218 |
| 6,281,986 | B1 * | 8/2001 | Form | 358/403 |
| 6,300,947 | B1 * | 10/2001 | Kanevsky | 345/866 |
| 6,336,124 | B1 * | 1/2002 | Alam et al. | 715/523 |
| 6,389,437 | B2 * | 5/2002 | Stoub | 715/523 |
| 6,456,305 | B1 * | 9/2002 | Qureshi et al. | 345/800 |
| 6,462,752 | B1 * | 10/2002 | Ma et al. | 345/684 |
| 6,539,406 | B1 * | 3/2003 | Ibarra et al. | 715/513 |
| 6,556,217 | B1 * | 4/2003 | Makipaa et al. | 345/667 |
| 6,593,943 | B1 * | 7/2003 | MacPhail | 345/734 |
| 2004/0133848 | A1 * | 7/2004 | Hunt et al. | 715/500 |

* cited by examiner

*Primary Examiner*—Bharat Barot
*Assistant Examiner*—David Lazaro
(74) *Attorney, Agent, or Firm*—Ronald M. Anderson

(57) ABSTRACT

A method and system for selectively fully displaying additional content in a browser window, without requiring scrolling in more than one direction, based on an available display area. For example, additional advertising content is thus selectively displayed in an otherwise unused area of the browsing window to the right of a primary content of a Web page. The size of the available display area is automatically detected, and a determination is automatically made as to whether the additional content and primary content can both be fully displayed in the available display area under the scrolling constraint. If so, both the additional content and the primary content are displayed. Otherwise, only the primary content is displayed. The additional content is downloaded only when it can thus be included within the display area. If the browser window is resized so that the additional content no longer fits without scrolling in more than one direction, the additional content is removed from the display, but is preferably retained in local storage for redisplay if the available display area is subsequently increased sufficiently. The type (and version) of browser program used is detected so that the appropriate instructions will be provided to the client device to selectively display additional content in this manner. For smaller client device displays, such as on those on pocket PCs, the content provided by a server is selectively determined in a prioritized manner, as a function of the available display area.

6 Claims, 13 Drawing Sheets

SELECTIVE DISPLAY OF CONTENT

FIELD OF THE INVENTION

The present invention generally relates to a method and system for controlling retrieval and display of content on a display device, and more specifically, to selective retrieval and display of additional content within a limited browser window display area, without requiring scrolling.

BACKGROUND OF THE INVENTION

World Wide Web (WWW) documents, or Web pages, are widely used for distributing information to a variety of client devices, including personal computers, Web-compatible television set top boxes, personal data assistants (PDAs), wireless telephones, and other Internet connected devices. However, the amount, and quality of content that can be displayed in a Web page without scrolling depends on the size of the device's browser window, which is limited by the available display resolution. When only a small display is available, some of the content may be hidden until the user scrolls the display to disclose the content within the browser window.

Clearly, scrolling to display hidden Web page content is not as convenient as displaying all of the content within a browser window. In contrast, when a large display area is available, the content often does not completely fill the available area, leaving blank space that could be employed to display additional content or information. This blank space within a browser window of a larger display area, which is not used for displaying the primary content of a Web page, would be especially useful for displaying advertising or other non-essential content.

On most personal computers, the minimum display resolution is 640×480 pixels, but it is generally assumed that most users will set their computer display for a resolution of at least 800×600 pixels. Although the maximum display resolution of the video adapters and monitors used on many modern personal computers are substantially greater than this, Web content developers typically design Web pages to be fully displayable without horizontal scrolling in an area of 800×600 pixels. The additional area within the browser window on systems set to a resolution greater than 800×600 pixels (when using the full display area) is thus typically unused on modern personal computer displays. Of course, a user can selectively set the size of a browser window on a display running at a higher resolution so that the browser window uses only a portion of the available display area. For example, the browser window can be selectively adjusted by a user for a width of 800 pixels on a display set for a resolution of 1024×768 pixels.

Conversely, on devices having display areas that are smaller than 800×600 pixels, such as PDAs or Internet enabled cell phones, a user will be required to scroll both horizontally and vertically to view all of a conventional Web page width. Clearly, it would be preferable to supply a Web page to a display of an Internet connected device that is appropriate for the currently available browser window area, so that the content can be viewed without scrolling in at least one of the horizontal and vertical directions.

Unfortunately, server-side documents and applications have no way of directly detecting the amount of display area available in the browser window on any given client device at any particular time. There are only a few ways of adjusting the amount of display area available on any given client device, running any given browser program, at any given time. For example, it might be possible to force a new browser window to open, and specify the browser window size to accommodate the Web page being requested. However, in this case, it would be necessary to make an initial assumption about the display area size available on the client device and predetermine the window size of the Web browser program. In any case, this solution would likely not be acceptable to users, because it would require the requested Web page to change the browser window size, which most users would likely find objectionable. The more common solution to this problem is for the server to simply download a requested Web page in the size required to hold additional content. However, scroll bars are then required to display the additional content, if the browser window on the client device is not sufficiently large.

In some instances, pre-designed content is split into layers or frames that draw from multiple source files. Each layer is set to be either displayed or hidden. However, there is no known use of layers or frames to selectively download and/or display portions of content based on fitting the content within the available display area to limit scrolling to at most one direction. Layering was designed to allow portions of content to overlap each other or appear in a sequence to provide an animation effect. Layering was not designed to provide non-overlapping selective display of content modules based on the size of the display area, because scrolling is relied on for viewing any content that is beyond the margins of the display area. Note also that layering is only applicable to controlling a browser program display, usually on a client device. Layering is not applicable to controlling an active server page, or other server program that does not relate to displaying content. Such server programs usually relate to non-visual data processing and communicating content from the server. Alternatively, frames enable a display to be split into sections, but each frame is provided with its own scrolling capability. Also, any additional scroll bars required in a frame take up more display area. Thus, frames do not enhance efficient use of the display or limit scrolling to at most one direction.

For many smaller devices with fixed display areas, servers detect the requesting device and provide separate specialized content that is formatted for the small display area. The content may be an HDML, WML, or other document format optimized for the size of the display of the requesting device. Often a separate single page of content is pre-defined to fit the display of the numerous possible requesting devices, which requires that multiple documents formatted for each display size be provided.

Alternatively, some systems use proxy servers with content manipulators to pre-process existing documents to reduce, convert and/or compress the content before sending it to the small device. Such systems include Puma Technoloy, Inc.'s PROXYWARE™, International Business Machines, Inc.'s transcoding proxies, and Spyglass, Inc.'s SPYGLASS PRISM™. The approach used by these systems is effected on proxy servers between the Web server containing the requested document and the requesting client device and provides for translating existing documents to a format suitable for the requesting device having a small display. However, no provision is made in these systems for the original designer of the content to modularize or prioritize the content, to control the portions of the content that are displayed based upon the available display or browser window area.

A further alternative would be to scale some content to fit within an available display area on a client device. However, this solution may cause content designed for a small display to be enlarged to fit within a large display area so much as to present a poor impression. Alternatively, content originally designed for a high resolution display may be reduced so much to fit in a relatively small display as to be unreadable or unusable. Also, graphical advertisements, such as banner advertisements, are not typically dynamically resizable, and their effectiveness will likely be substantially reduced if they are scaled. A better solution would be to determine the available size of the browser window or the display (if all of the display is available) and send only the highest priority portion of the content that will fit the available display area without requiring scrolling in more than one direction, or more preferably, without requiring scrolling in other than a vertical direction, or most preferably, without requiring any scrolling.

SUMMARY OF THE INVENTION

The present invention addresses the problems identified above by selectively displaying portions of content to fit an available display area, instead of leaving some display area unused or requiring a user to selectively view all the content by scrolling. A first aspect of the present invention is directed to a method for selectively displaying additional content on a display device within a limited browser window display area. The method includes the steps of detecting the size of an available display area, and determining whether the additional content and primary content can both be fully displayed in the available display area without requiring scrolling in more than one direction. If so, both the additional content and primary content are displayed. Otherwise, only the primary content is displayed in the display area.

The available display area includes the portion of a browser window that is available for displaying content (i.e., not occupied by tool bars, status bars, or other graphical user interface elements of a browser program). The method includes the step of detecting properties of the browser program, such as the specific browser program and version, so that appropriate instructions can be provided to the browser program that are compatible with it and will enable detection of the dimensions of the display area.

The step of determining whether both primary and additional content can be fully displayed in the available display area in this manner occurs when primary content is initially loaded by the browser program, whenever the browser window is re-sized, or upon the occurrence of another predefined event. The method can be implemented as an event handler that takes advantage of browser event triggers and will then store a pointer to any previously defined event handler used by the browser program that is replaced or supplemented by the event handler of the present invention. If appropriate, such a previously defined event handler is then executed after the selective display of the additional content, or if only the primary content is displayed.

Preferably, the method determines if at least one dimension (e.g., a width or a height) of the available display area is at least equal to a predefined value, so that the display area is sufficient to display the additional content without scrolling in more than one direction. The method can also iteratively determine whether still more content can be fully displayed in the available display area without requiring scrolling along with the primary content and any previously added content. Preferably, scrolling should not be required in a direction extending across the primary content and all of the additional content in the available display area.

The additional content is retrieved only when it can be displayed and is then retained in local storage. If the additional content was previously retrieved, it is obtained from the local storage and displayed along with the primary content, when the display area becomes sufficient to meet the requirements regarding scrolling in no more than one direction. Also, if the browser window is reduced so that the additional content cannot be displayed in the available display area, as noted above, the additional content is removed from the display, but remains available in the local storage if again needed, should the display area again become sufficient to include the additional content.

Another aspect of the invention is directed to a method for selectively displaying a selected portion of content (without a distinction between primary and additional content). An appropriate portion of the content is selectively displayed, based upon the available display area. In one preferred embodiment, portions of the content are assigned a predefined priority, to determine the portions that are displayed, as a function of the available display area. Alternatively, the content is altered to fit within the available display area by selecting those portions whose combined sizes make maximum use of the available display area.

Yet another aspect of the invention is directed to a method for selecting portions of content document based on a known available display area, before conveying the selected portions to a browser program. This method is especially useful for pre-selecting, communicating and displaying appropriate portions from within a page to fit small fixed-displays used for browsing, such as on some PDAs and cellular phones.

Another aspect of the invention is directed to a computer-readable medium having computer-executable instructions for performing the method disclosed above. A further aspect of the present invention is directed to a system that includes elements that carry out functions generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Exemplary Operating Environment

Figure 1:
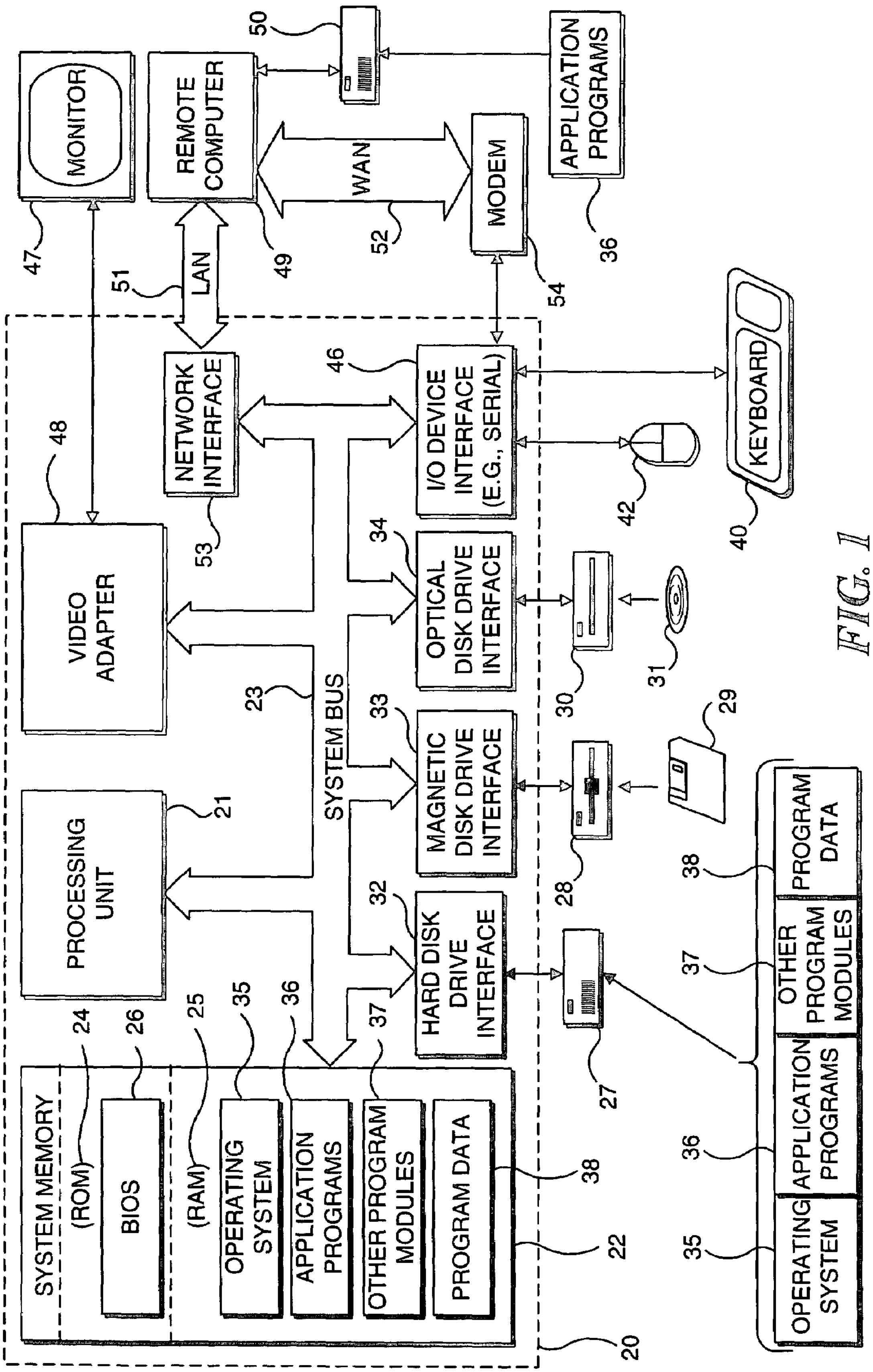
FIG. 1 is a schematic block diagram of an exemplary personal computer (PC) system suitable for implementing the present invention.

FIG. 1 and the following discussion are intended to provide a brief, general description of a suitable computing environment in which the present invention may be implemented, both in regard to a server that stores and provides Web pages and a client that requests the Web pages and displays them to a user. Although not required, the present invention will be described in the general context of computer executable instructions, such as program modules that are executed by a personal computer. Generally, program modules include routines, programs, objects, components, data structures, etc. that perform particular tasks or implement particular abstract data types. Moreover, those skilled in the art will appreciate that this invention may be practiced with other computer system configurations, particularly in regard to a client device for displaying a Web page, including hand held devices, pocket personal computing devices, digital cell phones adapted to connect to a network and other microprocessor based, or programmable consumer electronic devices, multiprocessor systems, network personal computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional personal computer 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31, such as a CDROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer readable media provide nonvolatile storage of computer readable machine instructions, data structures, program modules and other data for personal computer 20. Although the exemplary environment described herein employs a hard disk, removable magnetic disk 29, and removable optical disk 31, it will be appreciated by those skilled in the art that other types of computer readable media, which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36 (such as a browser program), other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display Web pages, and/or other information. In addition to the monitor, personal computers are often coupled to other peripheral output devices (not shown), such as speakers (through a sound card or other audio interface—not shown) and printers.

Personal computer 20 may operate in a networked environment using logical connections to one or more remote computers, such as a remote computer 49. Remote computer 49 may be another personal computer, a server (which is typically generally configured much like personal computer 20), a router, a network personal computer, a peer device, satellite or other common network node, and typically includes many or all of the elements described above in connection with personal computer 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets and the Internet.

When used in a LAN networking environment, personal computer 20 is connected to LAN 51 through a network interface or adapter 53. When used in a WAN networking environment, personal computer 20 typically includes a modem 54, or other means for establishing communications over WAN 52, such as the Internet. Modem 54, which may be internal or external, is connected to the system bus 23, or coupled to the bus via I/O device interface 46, i.e., through a serial port. In a networked environment, program modules depicted relative to personal computer 20, or portions thereof, may be stored in the remote memory storage device. It will be appreciated that the network connections shown are exemplary and other means of establishing a communications link between the computers may be used, such as wireless communication and wide band network links.

Exemplary Implementation of the Present Invention

The following describes an exemplary implementation in a first preferred embodiment of the present invention corresponding to its use in displaying additional content generally to the right of the primary content in the display area of a browser window on a personal computer monitor. Additionally, the following implementation is described in the context of a browser program displaying Dynamic Hyper-Text Markup Language (DHTML) Web page documents on a client computer in communication with a server via the Internet. However, as suggested earlier, this example is not meant to be limiting, as it will be understood by those skilled in the art that the concepts and method disclosed below are applicable to any type of device for displaying content, including network appliances, PDAs, cellular phones, and the like. It is also contemplated that the concepts and method disclosed below are applicable to any type of documents based on a markup language, including HTML, standard generalized markup language (SGML), extensible markup language (XML), hand-held device markup language (HDML), wireless markup language (WML), and other documents of the like. It will further be understood that the concepts and method disclosed below are applicable to any type of compiled or interpreted component, including Microsoft Corporation's WINDOWS™ script components, component object model components, document object model components, Microsoft Corporation's ACTIVEX™ controls and Active Server Pages, common gateway interface applications, Sun Microsystems, Inc.'s JAVA™ applets, JAVA™ servlets, and the like. Also, the concepts and method disclosed below are applicable to any type of compiled or interpreted computer code language, including C++, Sun Microsystems, Inc.'s JAVA™, JavaScript, VBScript, ECMAScript, WMLScript, Perl, and the like.

Generally, this embodiment of the present invention selectively adds extra content to make use of otherwise unused available space in a browser window display area, where the available space is beyond the limits of a primary content in at least one direction. But the extra content is displayed only if the available area in the window (or display) is sufficiently large to accommodate both the primary and the additional content without requiring the user to scroll in more than one direction. Preferably, any scrolling should be in a direction that does not extend across the primary and extra content and will typically be only in the vertical direction, since in many cases, the extra content will be selectively added to one side of the primary content. Simply adding additional content to an existing Web page without regard to the available display area in a browser window, as commonly done in the prior art, is an undesirable alternative to the present invention, because a user may be required to scroll both vertically and horizontally to view all of the content, i.e., both the primary content and the additional content. As noted above in the Background of the Invention, it is undesirable for a user to scroll both vertically and horizontally to access all of a Web page—primary and added content.

Figure 2A:
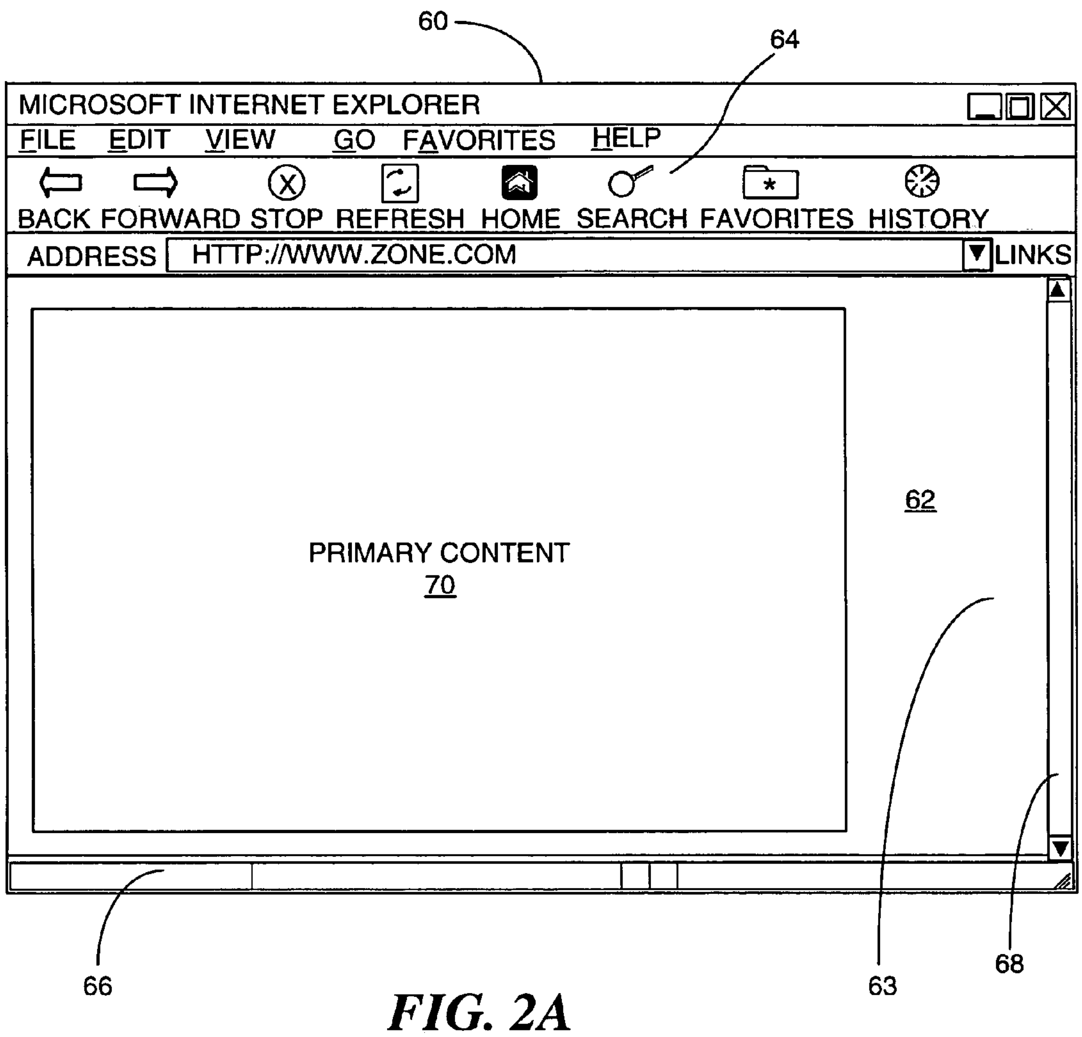
FIG. 2A is a representation of a browser window displaying only a primary content of a Web page.

FIG. 2A illustrates a generally conventional browser window 60 with a content display area 62, a menu and toolbar area 64, a status bar 66, and a scroll bar 68. Shown within content display area 62 is a primary content 70. Primary content 70 may comprise text, video, or graphics and may include sounds, or other content of the various types typically contained in Web pages. Web page documents are typically requested by a user from a remote server (not shown) and are downloaded from the remote server into the browser window over the Internet, and/or other network, such as an intranet. Most Web page documents are designed to be displayed within a predefined display area, such as 800×600 pixels. However, the browser window may be opened and maximized (or adjusted to a larger size than the area which the primary content was designed to occupy) on a display or monitor having a substantially greater resolution, e.g., 1024×768 pixels. When primary content 70 is displayed within this larger area of browser window 60, an additional display area 63 is available within content display area 62, but is not used for the primary content. In most cases, additional display area 63 is thus "wasted." Conversely, if the primary content is designed for a display area larger than display area 62, a user must scroll the primary content within display area 62 using scrollbar 68 (and/or its horizontal equivalent—not shown), to view the remainder of the primary content.

To enhance the user experience when viewing a Web page, it is desirable to reduce or eliminate the need to scroll to view the entire content that can be displayed. The user should not be required to scroll in more than one direction (preferably, only vertically) to fully view a Web page. On the other hand, it is often desirable for commercial reasons, to maximize the amount of content displayed in content display area 62, particularly if the additional content added to the Web page includes advertising that can increase revenues for a Web site.

Figure 2B:
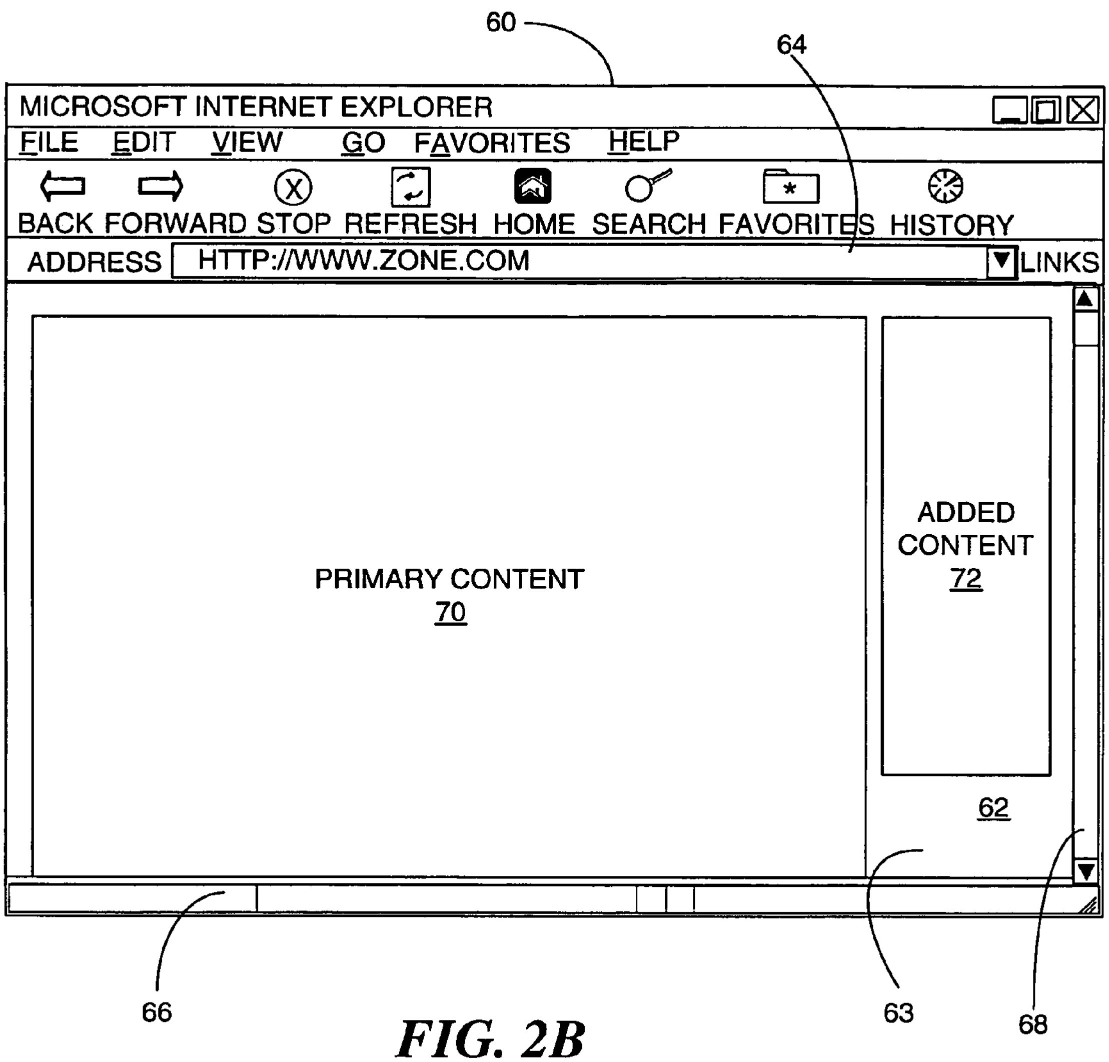
FIG. 2B is a representation of a browser window displaying an additional content to the right of the primary content.
Figure 2C:
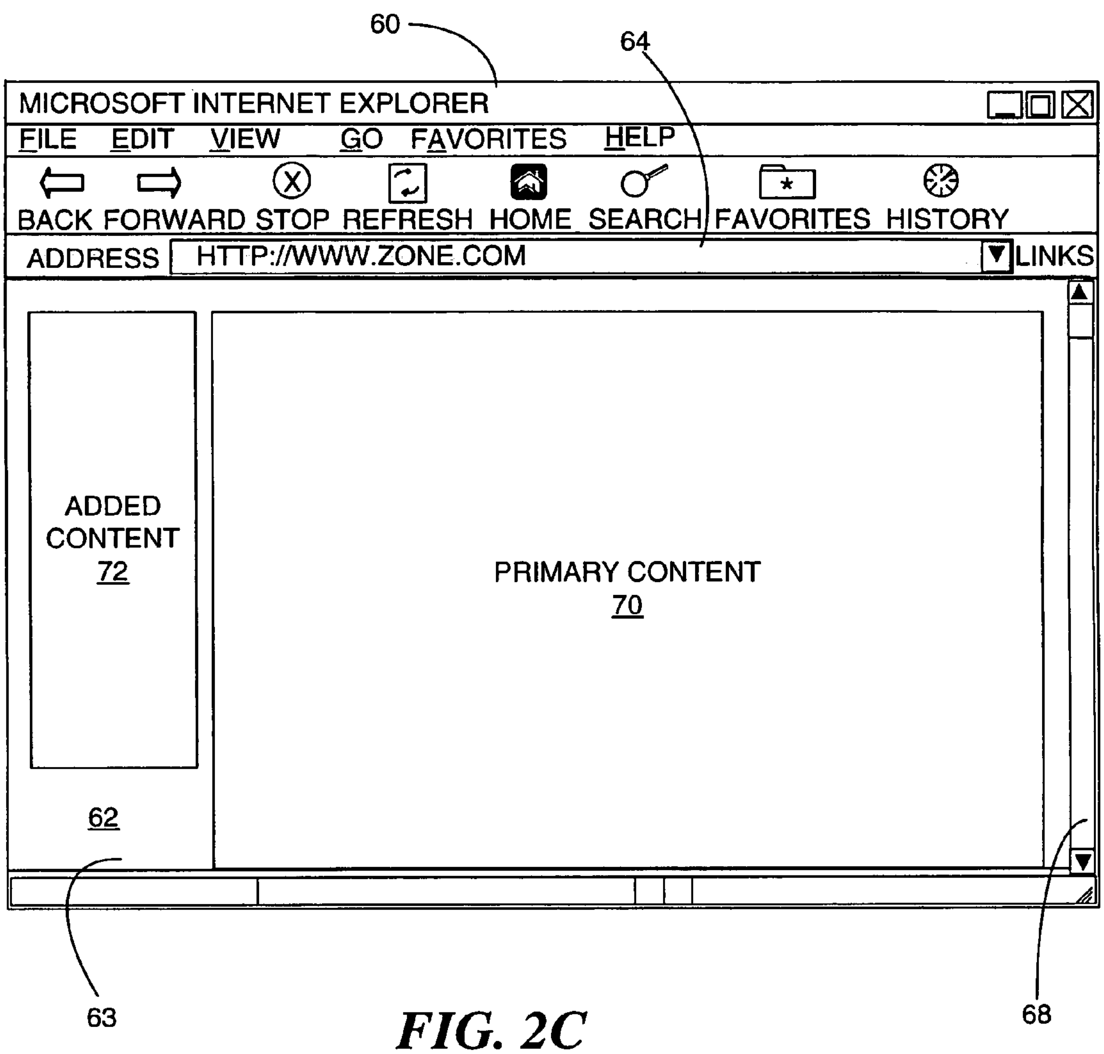
FIG. 2C is a representation of a browser window displaying an additional content displayed to the left of the primary content.

To balance these competing interests, a preferred embodiment of the present invention selectively displays added content 72 in an unused portion 63 of content display area 62, as shown in FIG. 2B. In the preferred embodiment of the present invention shown in FIG. 2B, unused portion 63 of content display area 62 is disposed to the right of primary content 70, and added content 72 will likely (although not necessarily) include advertising that is not generally related to the primary content. However, different preferred embodiments of the present invention can alternatively display added content 72 in other portions of the display area 62, such as to the left of the primary content 70, as shown in FIG. 2C. Furthermore, the added content may be directed to information that is related to the primary content.

Figure 2D:
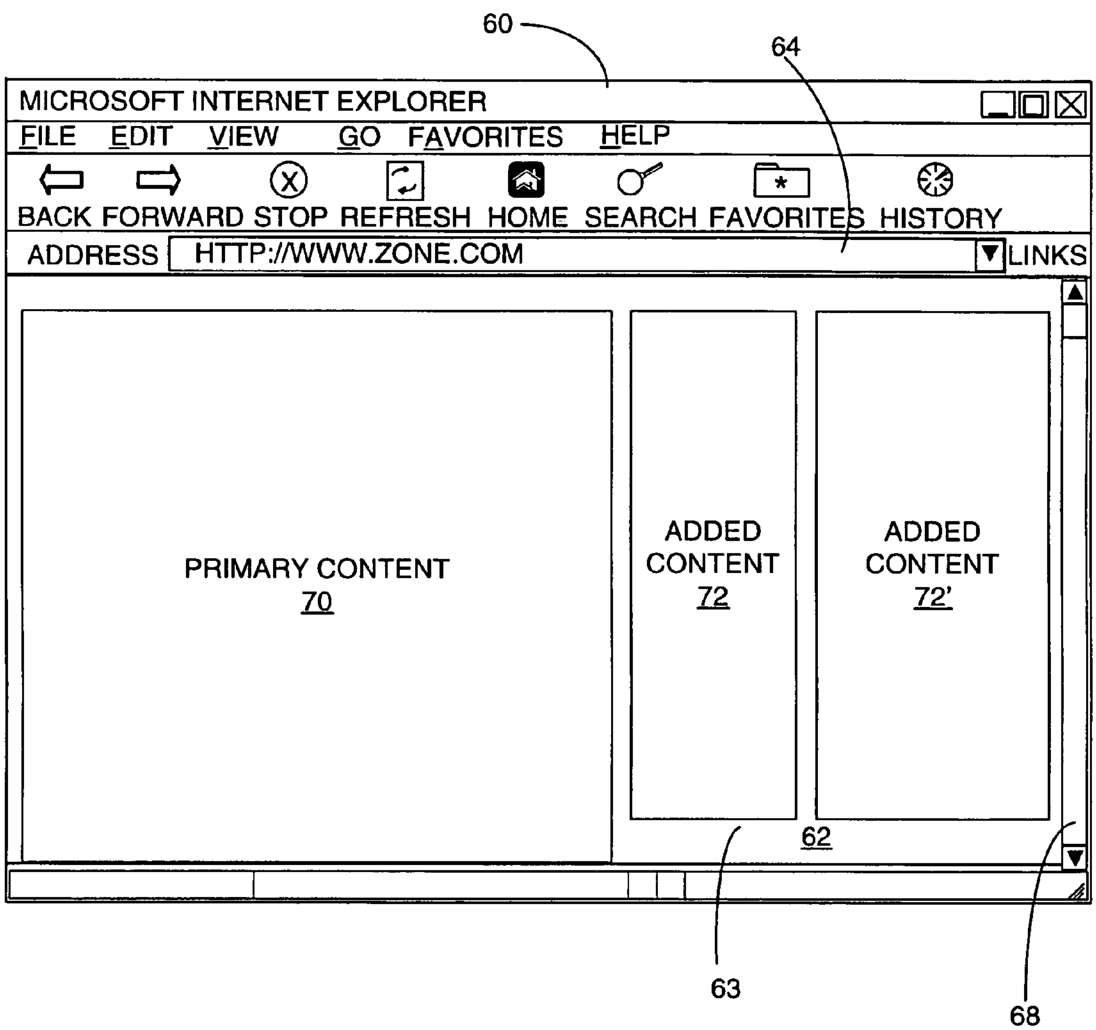
FIG. 2D is a representation of a browser window displaying a plurality of additional content selections, in two columns to the right of the primary content.

As additionally illustrated by FIG. 2D, multiple additional content can be selectively displayed in the unused portion of available content display area 62. Moreover, this embodiment of the present invention selectively displays both primary content 70 and additional content 72 in content display area 62 only when the primary content and the one or more modules of additional content can be displayed without requiring scrolling in more than one direction. Thus, in FIG. 2D, added content 72 and added content 72' would be displayed along with primary content 70 only if there is sufficient display area to the side of primary content 70 so that all three modules can be displayed across the width of the screen without scrolling both vertically and horizontally. In this example, scrolling is required only in the vertical direction to enable all of the contents of these three modules to be fully displayed, because the primary content extends below the bottom of the available content display area.

As a further alternative, the added content 72 could be displayed to the left of primary content 70, and added content 72' displayed to the right of the primary content 70. As a still further alternative, either or both of the added content modules could be displayed above or below the primary content 70. While less desirable, scrolling would still only be necessary in the vertical direction to display all of the primary and added content. The invention can also be practiced to selectively display additional content only if scrolling will not be required in either direction.

Figure 2E:
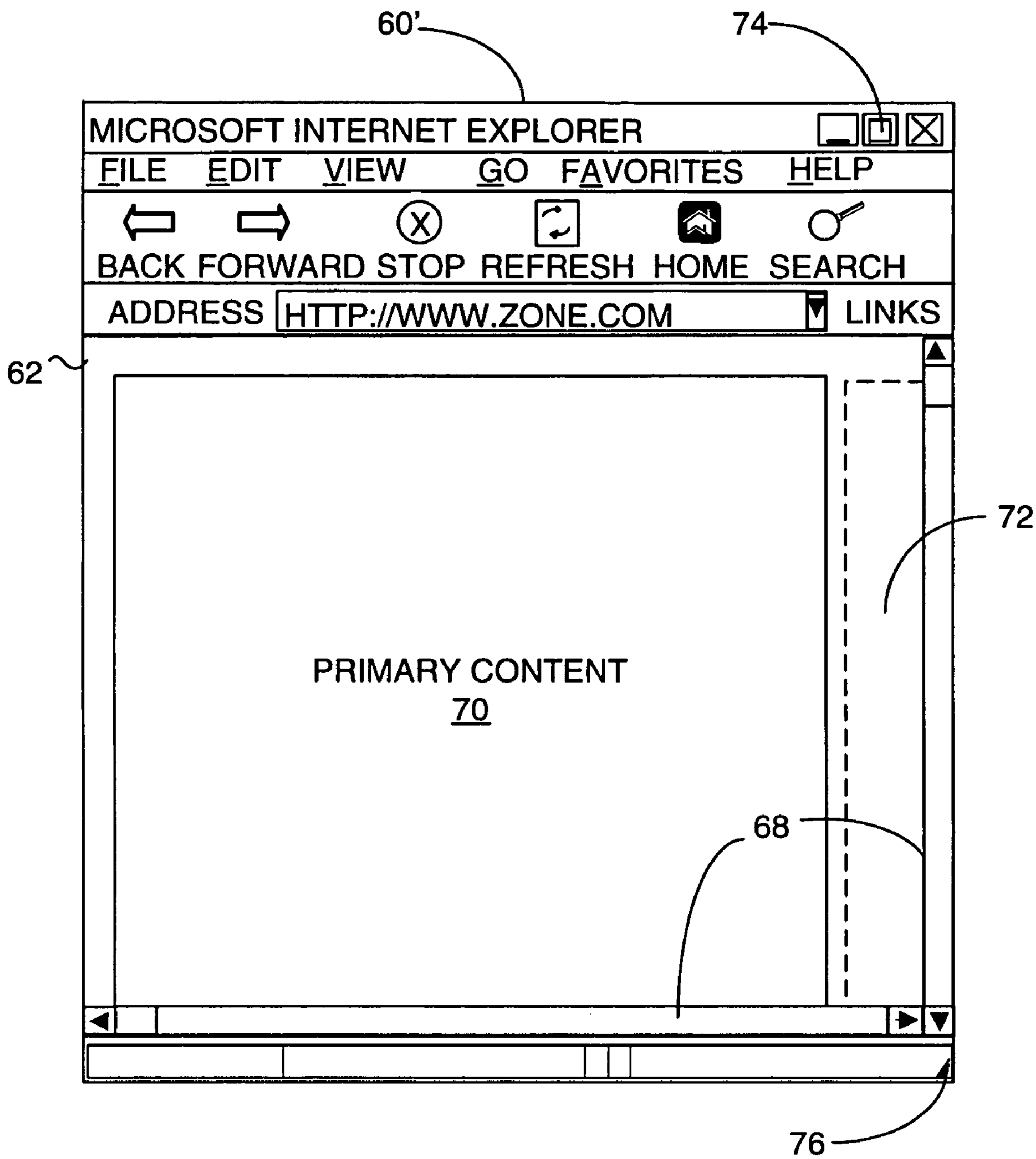
FIG. 2E is a representation of a prior art browser window in which the size of the display area is such that it can only display a primary content of a Web page and which employs scroll bars to display any additional content.

The following example should ensure that the differences between the present invention and the conventional approach for handling content greater than an available display or browsing window area is clear. In the conventional approach, scrolling in both the vertical and horizontal directions may be required to display all content if a browser window 60 is limited or resized to such dimensions that content display area 62 is insufficient to display either or both the primary and additional content in both directions. FIG. 2E illustrates a prior art browser window 60' that is sized so that only primary content 70 can be fully displayed across the width of the content display area. Phantom lines indicate where a portion of additional content 72 would appear if it were added without employing the present invention, and it should be understood, that unless the user scrolls to the right, the remainder of the additional content that is currently hidden will not be displayed. Employing the present invention, the browser program would not even load additional content 72, because to do so would require that the user scroll both vertically and horizontally to view the entire content. By detecting that insufficient display area dimensions exist during an initial load of the primary content of a Web page, the present invention eliminates the unnecessary communication and retrieval of that additional content, and avoids the undesired scrolling that would be required to fully view additional content 72.

Clearly, a user may reduce the size of a browser window after additional content 72 has already been fully displayed. The size of the browser window is typically reduced by pressing a restore/maximize button 74, by dragging a browser window dynamic resize control 76, or by dragging an edge of browser window 60. In response to these actions, the browser program would normally add horizontal and/or vertical scroll bars 68 (if not already provided) as needed to enable the user to view all of the content in each direction in which the full content is no longer displayed. Browser programs are not currently designed to remove any content from the display in an attempt to reduce or eliminate the need for scrolling. In fact, they are specifically designed to automatically provide scrolling, because they currently treat all content equally. To provide greater control over the display of content, the present invention responds to actions that reduce the size of the browsing window below that required to display all of the content without scrolling, by removing additional content 72 from the display, so that at most, primary content 70 must be scrolled to view all of it.

As indicated above, removing additional content 72 to reduce or eliminate scrolling of the browser window in more than one direction improves a user's experience. Also, the additional content, once downloaded to be displayed, is preferably retained in memory to enable the additional content to quickly be re-displayed if the browser window is subsequently sufficiently enlarged to fully display the primary and additional content without scrolling in more than one direction. This feature eliminates the need to again load the additional content from a remote permanent storage, which would likely be on a server.

Preferably, the present invention is automatically initiated when a Web page is initially loaded, and in response to a resizing of the browser window for any reason. These events are triggers to which the browser program will typically already respond, and can be utilized to initiate browser compatible instructions that are different than those normally executed by the browser program. One embodiment of the present invention includes an event handler that preemptively extends any corresponding previously defined event handlers. A Web page designer simply includes a call to the invention, which automatically responds to each relevant event trigger, such as the initial loading of the Web page or the resizing of the browser window.

Figure 3:
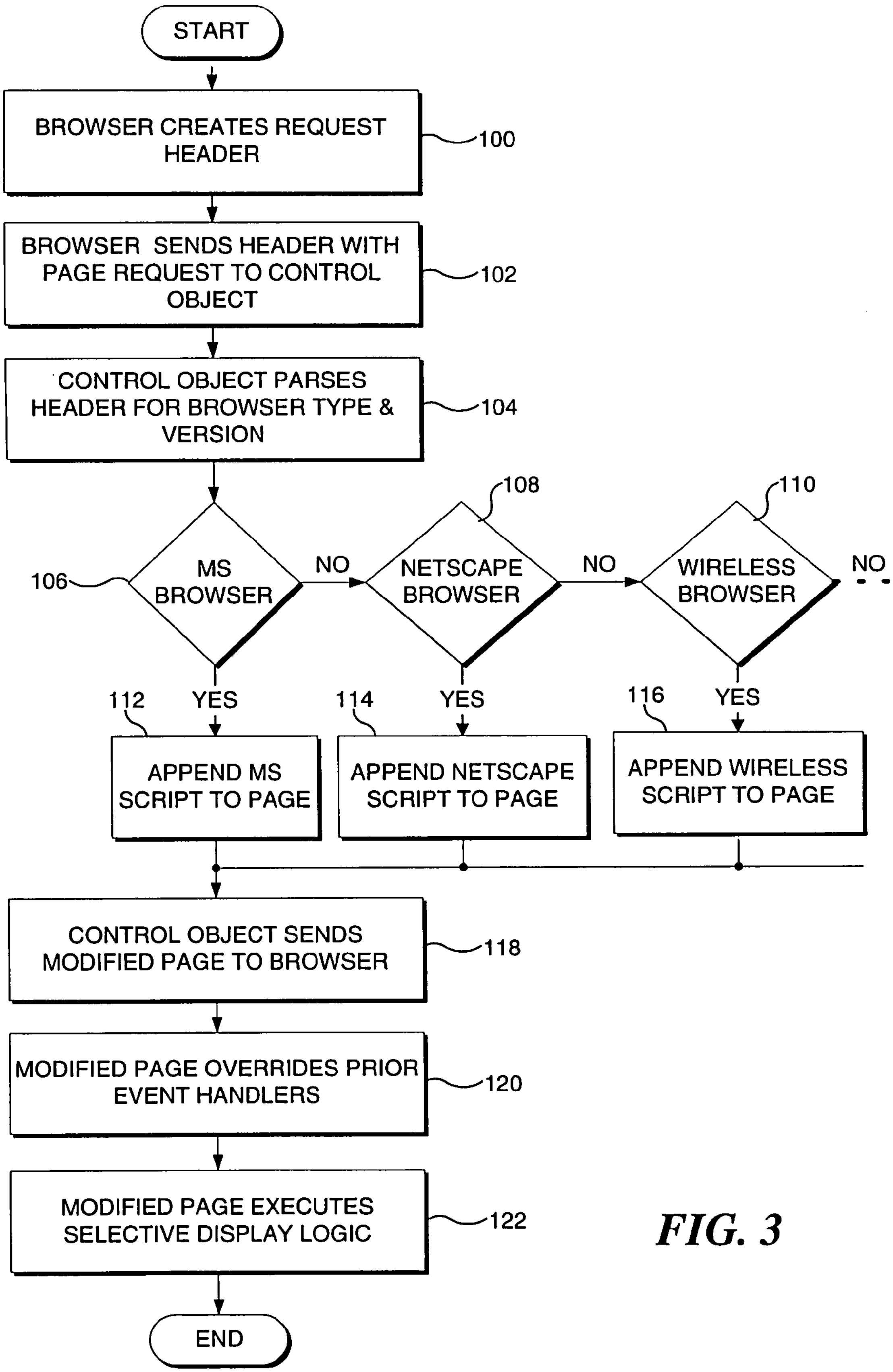
FIG. 3 is a flow diagram illustrating the logic used by the present invention to provide instructions that are compatible with a requesting browser to selectively display additional content in a Web page based on the available display area.

The specific event handler instructions used to implement the present invention depend upon the type and/or version of browser program used to display the Web page content. FIG. 3 illustrates how specific browser-compatible instructions are provided to the browser program. In this preferred embodiment, a browser program executing on a personal computer connected to the Internet communicates via Transmission Control Protocol/Internet Protocol (TCP/IP) with a Web server. When a user of the browser program requests content from the server by selecting or entering a uniform resource locator (URL) for a Web page, the browser program creates a request header, as indicated in a block 100 of FIG. 3. A request header is typically a Hypertext Transfer Protocol (HTTP) string that identifies the client device and its IP address on the network. The request header also identifies certain properties of the requesting browser, such as the type of browser program and its version. The type of browser may be Microsoft Corporation's INTERNET EXPLORER™, Netscape Corporation's NAVIGATOR™, or other browser that operates on one of the various client devices described above. The portion of the header that includes the browser type is often referred to as the "user agent string." At a block 102, the browser program communicates the header, along with the rest of the content request to a control object in software executed on a Web server.

The request is typically for a Web page document containing the primary content 70 at a Uniform Resource Locator (URL) address. Preferably, the requested Web page is an active server page that contains instructions to execute a control object on the Web server that will provide the browser compatible instructions. Another alternative would be to intercept the request at some intermediate point prior to retrieving the requested Web page and pre-process the request to identify and obtain browser compatible instructions. Yet another alternative would be to intercept the request and pre-determine whether and which additional content 72 (if any) should be returned to the browser program along with primary content 70.

In the illustrated preferred embodiment, the requested Web page calls a control object on the server that reads and parses the request header to obtain the browser type and version information as shown at a block 104. The parsed browser type and version information is compared with known browser types (and versions—although not specifically shown) in decision blocks 106, 108, and 110, etc. to determine the instructions that will be compatible with the browser program that sent the request. At one of blocks 112, 114, 116, etc. the compatible instructions for the browser program (and version) that was determined are appended to the requested primary content Web page file. In a preferred embodiment, these instructions are script code, such as JavaScript, that are appended to the Web page document containing the requested primary content 70. At a block 1118, the Web server control object then sends the modified Web page to the browser program on the client device over the network.

When the modified Web page is received by the client at a block 120, the browser program first executes that portion of the new instructions that overrides or supercedes prior corresponding event handler instructions, if any, which were included in the original Web page for responding to a trigger event, such as an OnLoad event or a Resize event. Specifically, the new instructions first rename any event handlers previously assigned to an OnLoad, Resize or other predetermined event trigger. This step preserves the prior event handlers for later execution. Then, the new instructions assign the new event handler to these event triggers. At a block 122, the browser program on the client device then executes the new instructions comprising the superceding event handler to selectively display additional content if the display area is sufficient to support both the primary and additional contents without requiring scrolling in more than one direction.

Figure 4:
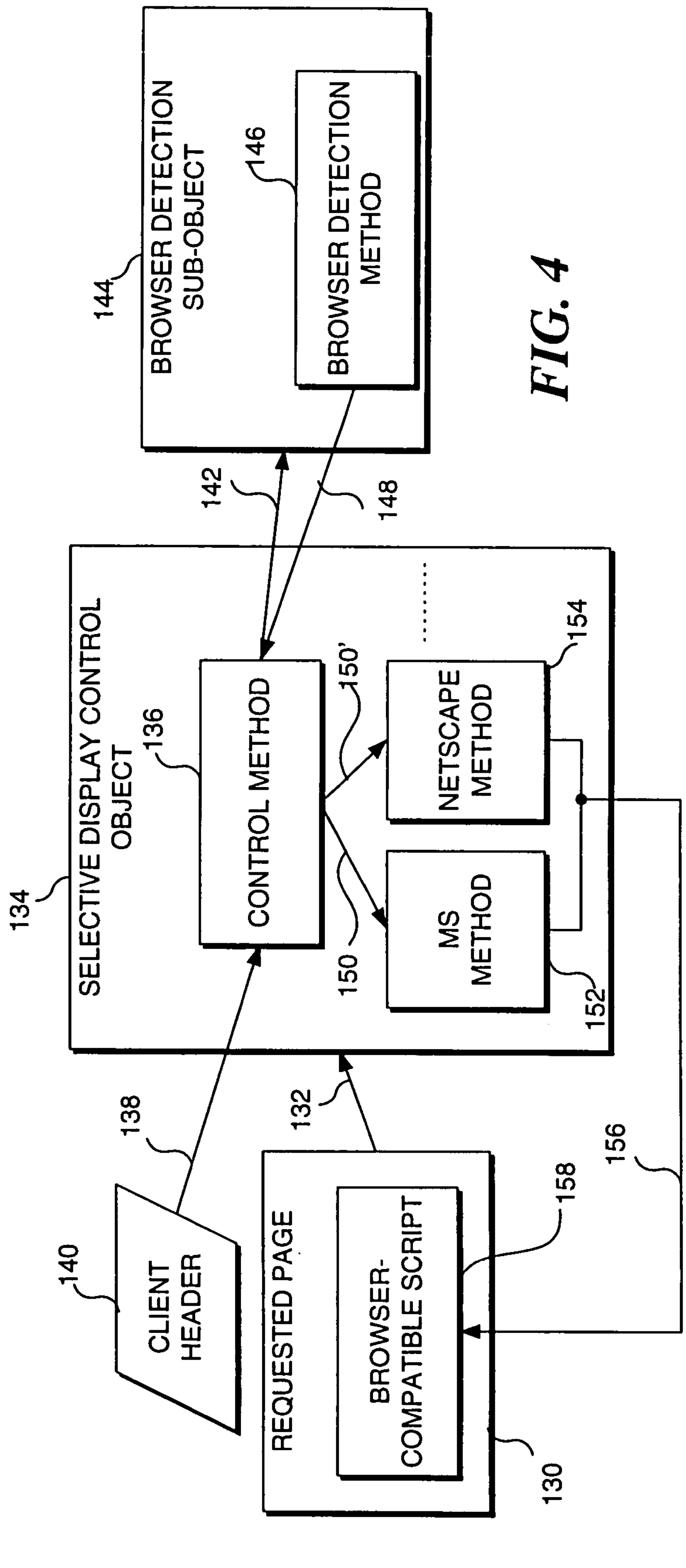
FIG. 4 is a block diagram illustrating components used by a preferred embodiment of the present invention to provide instructions that are compatible with a requesting browser to selectively display additional content in a Web page based on the available display area.

FIG. 4 illustrates aspects of this preferred embodiment of the present invention in regard to the control objects executed on the Web server. As indicated above, a requested Web page document 130 preferably contains both primary content 70 and script code. However, it may contain only code that refers to another primary document file, or files that contain primary content 70. Preferably, the requested Web page document does not include additional content 72. Instead, additional content 72 is preferably contained in a separate document file. Thus, requested Web page 130 is preferably an active server page (ASP), Common Gateway Interface (CGI) application, or other functional document. Such a document will contain JavaScript, Perl, or other executable code embedded within it. Those skilled in the art will recognize that requested page 130 is not limited only to Internet Web pages, but may be any type of file or other resource that can be requested by a client device for display.

When a browser program executed on a client device requests Web page 130 from the Web server, the script code within the requested page 130 makes a function call 132 to a selective display control object 134. Selective display control object 134 contains a control function or control method 136 that controls the Web server side operations. Via a data retrieval operation 138, control method 136 retrieves client request header information 140 and communicates the information through a function call 142 to a browser detection sub-object 144. Browser detection sub-object 144 implements a browser detection method 146 that parses and detects the browser properties from client request header information 140. The browser detection method then relays the browser type and version via a function call return 148 back to control method 136. Control method 136 uses the browser type and version to determine the compatible browser instructions that should be appended to requested Web page 130. Control method 136 makes an appropriate function call 150 or 150', respectively directed to MS Method 152 or Netscape Method 154 (or other), to the appropriate method to retrieve or generate instructions to selectively display additional content in the indicated browser program. The appropriately called method retrieves or generates code compatible with the browser program indicated to be running on the client device. The compatible code is communicated via a function return 156 and added to requested page 130 as browser compatible script 158. The modified page is then communicated back to the browser on the client device over the Internet or other network that connects the server with the client device.

Figure 5:
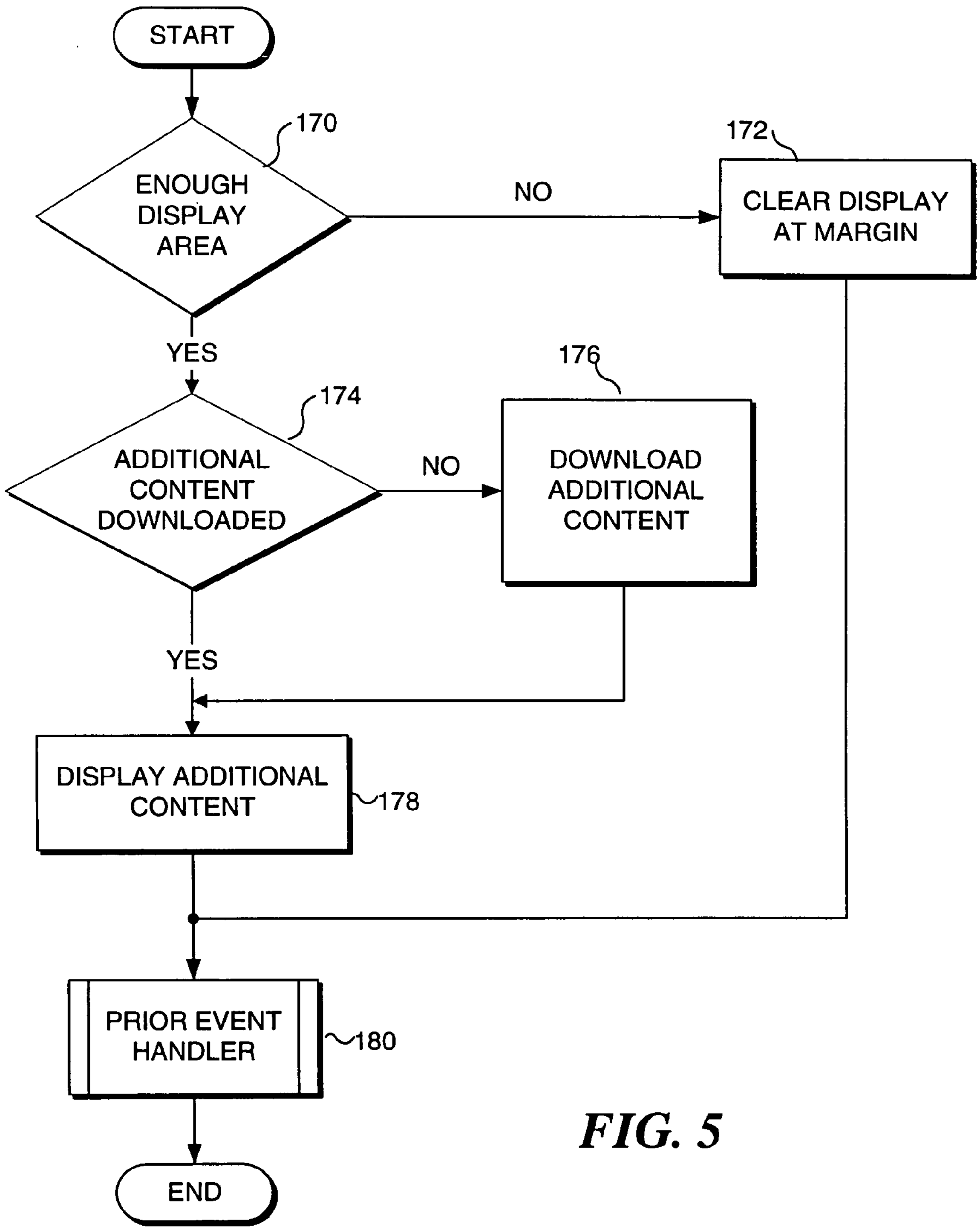
FIG. 5 is a flow diagram illustrating the logic used by the present invention to selectively display additional content in a Web page based on the available display area.

As described above, the instructions included in the modified Web page override prior event handlers but preserves a pointer to the prior event handlers for later execution, as appropriate. The core selective display operation is executed as a superceding event handler by the client browser as illustrated in FIG. 5. As also noted above, this event handler embodiment is triggered by an OnLoad, Resize, or other pre-selected event.

Upon the occurrence of such an event, a decision block 170 in FIG. 5 provides for determining whether enough display area is available in the browser window to display both primary and additional content without scrolling in more than one direction. Browser-compatible instructions call on Document Object Model components of the browser program to detect the dimensions. For example, JavaScript instructions compatible with Microsoft's Internet Explorer browser call a "clientWidth" property of the Document object to determine the width in pixels of content display area 62 in the browser window.

If the size of the content display area is insufficient to display the added content and the primary content without requiring scrolling in more than one direction, remaining display portion 63 around the primary content is cleared in a block 172, and by following the pointer to the prior event handlers, they are executed, as provided in a block 180. Thus, in an initial OnLoad case, the new event handler instructs the browser program to forego even downloading additional content 72 if the display is not sized sufficiently to accommodate (i.e., view all of) both the primary content and additional content without scrolling in more than one direction. This feature eliminate the unnecessary downloading of additional content 72 from the Web server. Alternatively, in response to an OnResize event, clearing the remaining display portion 63 effectively removes additional content 72 from the display when content display area 62 is reduced to a size insufficient to fully display both primary and additional content without scrolling in more than one direction. Thus, the same instructions are effective for multiple types of event triggers.

Conversely, if sufficient content display area 62 is available, a decision block 174 provides that the event handler determines whether the additional content was previously downloaded, which may have occurred in order to display the additional content before the browser window was reduced in size. If the additional content was not previously downloaded, then a request is made to the server to download additional content 72 at a block 176. Waiting until this point to download the additional content avoids unnecessary time in downloading the additional content if it will not be displayed. However, once the additional content has been downloaded and displayed, saving the additional content in a cache in memory on the client device avoids the time required to download the additional content again. Once the additional content is available at the client device, at a block 178, the browser displays the additional content along with the primary content.

A second preferred embodiment of the present invention employs layer or frame concept when displaying content as a function of the available browser window/display size. This embodiment first determines whether enough display area is available to display the additional content without requiring scrolling in more than one direction, and if so, generates or otherwise provides appropriate browser compatible instructions for displaying a layer that includes the additional content. The additional content source file is communicated to the browser program along with these instructions. In all other respects, this second embodiment is identical to the first disclosed above. Those skilled in the art will recognize that the approach used in this second embodiment can be iterated for selectively displaying multiple modules of content so long as sufficient content display area 62 remains to display each successive module. However, if the display area is only sufficient for the primary content, then no browser compatible instructions are transmitted to the client device or executed for displaying a layer of additional content. Also, no source file of the additional content layer is communicated to the browser program. Once the additional content is displayed in either the first or the second embodiment, the pointer to the corresponding prior event handlers, if any, enables them to be executed at step 180 in FIG. 5.

Figure 6:
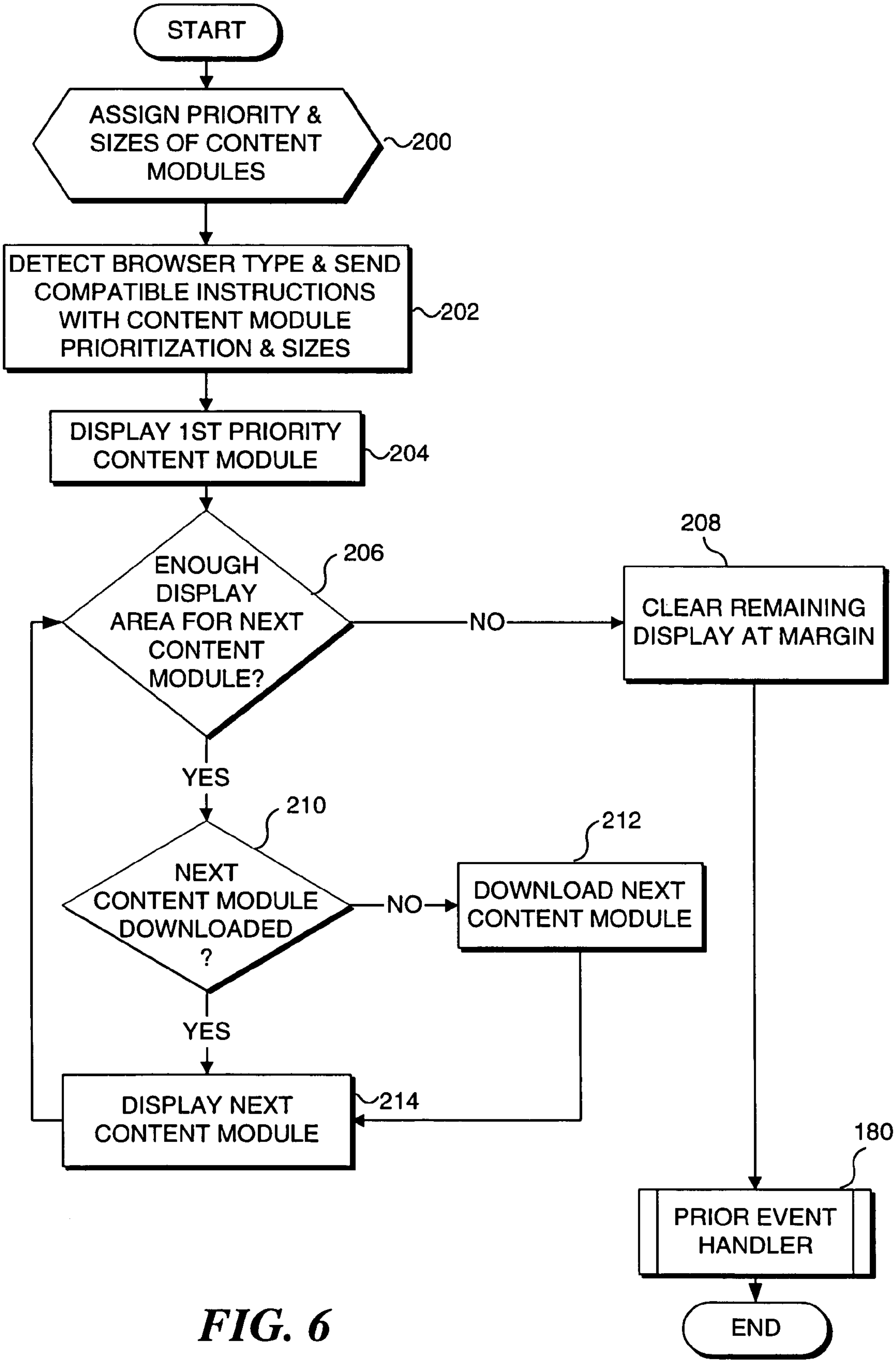
FIG. 6 is a flow diagram illustrating the logic used by the present invention to selectively display multiple content modules in a Web page based on the available display area and a prioritization assigned to the content modules.

FIG. 6 illustrates logic for another iterative embodiment of the invention. The iterations in this case are based on a priority assigned to content modules. In a block 200, a priority is assigned and the size of each content module is defined. The size is preferably defined in pixels. As in the previous embodiments, the browser type and version are determined from the header of a request received from the client device in a block 202, and browser compatible instructions are prepared for communication to the browser program being executed on the client device. However, in this embodiment, the content module priorities and sizes are also communicated to the browser program. In a manner analogous to displaying primary content 70, this embodiment displays a first (highest) priority content module in a block 204. In a decision block 206, the browser compatible instructions determine a remaining display area and compare that remaining area with the size of the next priority content module. If the remaining display area is insufficient to accommodate the next priority content module (i.e., the content module with the next lower priority), then this embodiment clears the remaining display area at the margin of the display (or browser window), as indicated in a block 208. As in previous embodiments, the pointer to the prior event handlers corresponding to those implemented by the instructions transferred to the browser program, if any, is recalled and the prior event handlers are executed in block 180, just as in the previous embodiments.

If the determination made in decision block 206 is that sufficient display area is available to accommodate the next lower priority content module, a decision block 210 determines whether the next priority content module has been already downloaded. If not, the next priority content module is downloaded to the browser program in a block 212. This next priority content module is then displayed in a block 214. If the next priority content module was already downloaded in the determination made in decision block 210, it is also displayed as provided in block 214. The logic then returns to decision block 206 to determine whether any remaining display area can accommodate the next lower priority content module. This iteration continues until the remaining display area is insufficient in size to accommodate the next priority content module.

Figure 7:
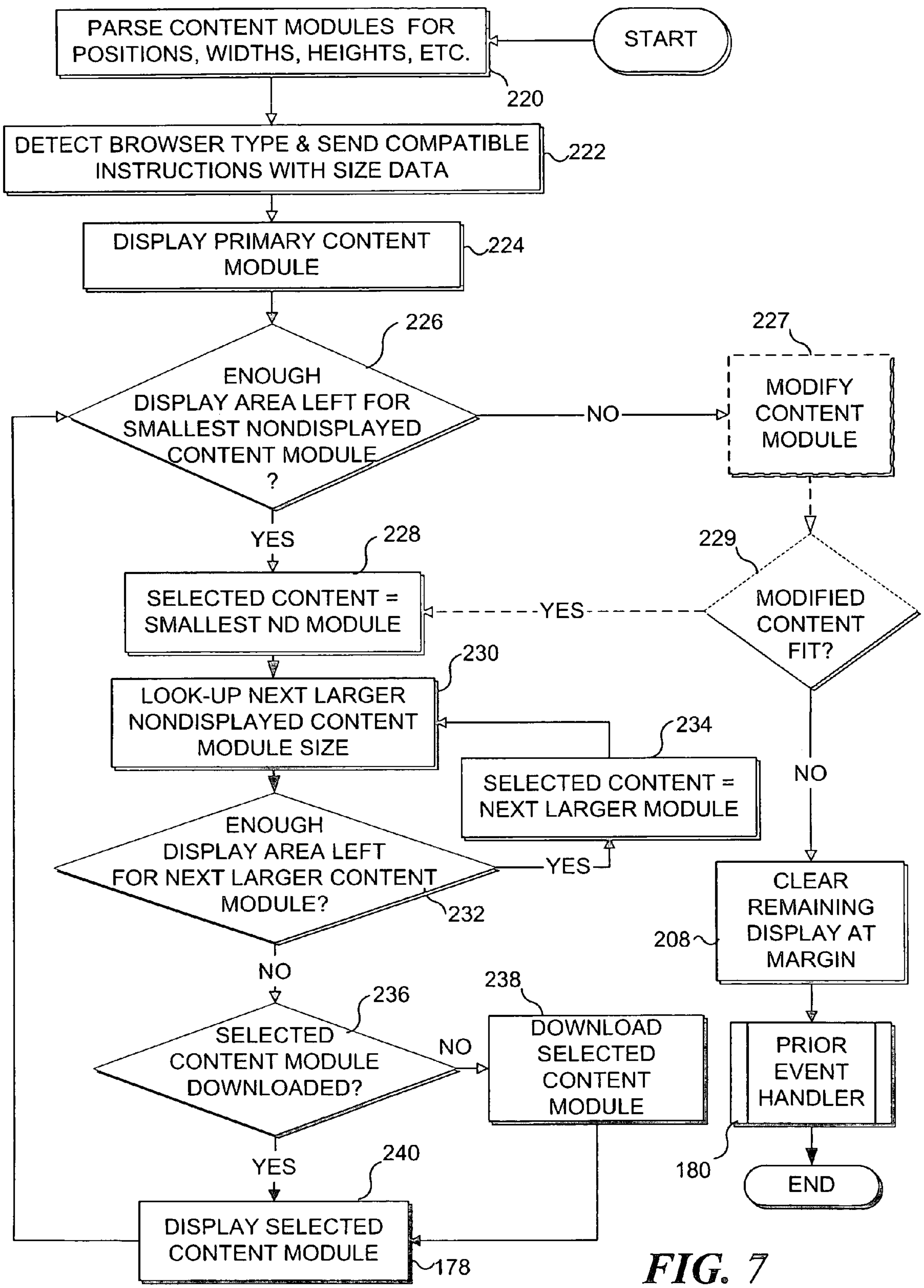
FIG. 7 is a flow diagram illustrating the logic used by the present invention to selectively display multiple content modules in a Web page based on the available display area and the size of the content modules.

The logic for another embodiment is illustrated in FIG. 7. This embodiment maximizes use of the available display area by selecting and displaying content modules that will fill the largest amount of display space available without requiring scrolling at all, or alternatively, in no more than one direction. To do so, this embodiment parses the content modules for their dimensions and/or designated positions in a display or browser window, in a block 220. This step can be accomplished by reading DIV tags or individual style attributes of a markup language document. This embodiment is especially well-suited for implementations that utilize cascading style sheets and/or other forms of absolute positioning. As before, a block 222 detects the browser type and version and returns corresponding browser compatible instructions along with the parsed size data for the content modules. A block 224 indicates that a primary content module is displayed. An alternative variation of this embodiment displays the largest content module that will fit within the available content display area without scrolling in more than one direction (or optionally, without scrolling at all).

A decision block 226 determines whether there is enough display area remaining for the smallest currently non-displayed content module to be added. If not, then optionally, the smallest non-displayed content module is modified in an attempt to fit the module to the remaining display area at a block 227. Modifications include changing one or more dimensions of the content module, scaling the content module, changing text font size within the content module, rotating the content module, providing a moving image of the content within the content module, converting the content to audio or other manipulation of the content module. These manipulations can be accomplished with a variety of methods, including changing individual style attributes within tags, block attributes, or other content attributes. The changes can also be accomplished dynamically with scripting. Once a modification is made, it is determined at optional decision block 229 whether the modified content module will now fit in the remaining display area. If so, then the process can continue attempting to fit more content modules. Otherwise, the remaining display area is again cleared in a block 208, and the pointer that was saved for any prior event handlers is used to execute the prior event handlers as provided in block 180. If enough display area remains for display of at least the smallest currently non-displayed content module, then the logic of this embodiment attempts to determine the largest possible remaining content module that can be fit into the remaining display area. Initially, the logic assigns the smallest non-displayed content module as a selected content module in a block 228. In a block 230, the logic identifies the size of the next larger currently non-displayed content module. The size of the next larger content module is compared with the remaining display area to determine whether this next larger content module can be inserted into the remaining content display area, in a decision block 232. If so, a block 234 identifies this next larger content module as the selected content module instead of the previous smaller content module, and the logic loops back to block 230. The loop that includes block 230, decision block 232, and block 234 continues reiteratively, until the largest content modules not currently displayed that will fit in the remaining content display area is identified. Each iteration could also optionally include block 227, or sub-iterations of block 227, to modify the content module in further attempts to fit the module to the remaining display area. Correspondingly, an optional decision block 229 can be included to determine whether the modified content module will fit. The step of modifying individual content modules can be incorporated into any of the embodiments to fit the content into the display area or otherwise provide the content (e.g. provide an audible content), subject to the display area restraints. A decision block 236 then determines whether the selected content module has already been downloaded. If not, a block 238 provides for downloading the selected content module. As before, once the browser program has recalled the selected content module from a storage (if it was previously downloaded and displayed) or newly downloaded the selected content module, then the selected content module is displayed in the remaining content display area in a block 240. Although the largest possible content module has thus been selected, some additional content display area may still remain in which a smaller content module may be displayed. Thus, the logic returns to decision block 226 to reiterate the process until not even the smallest currently remaining non-displayed content module will fit into the remaining content display area.

As noted above, this embodiment does not rely on knowing the size of a primary content. It need not assume, for example, an 800×600 pixel resolution. Instead, it dynamically determines the size of each content module and dynamically positions the largest currently non-displayed content modules that will fit, in the available content display area.

However, some browser programs, particularly older versions of currently popular browser programs, do not have the ability to dynamically detect the size of an available content display area. In other cases, the browser window size can not be changed and may be matched or limited to the entire physical display area provided on the client device, as will typically be true of reduced-capability browser programs that execute on client devices such as PDAs, cellular telephones, and other similar small, portable client devices. Nevertheless, many of these browser programs will still have the ability to display content in various locations within the content display area, even if the content is limited to a few small icons or only a few lines of text. Thus, some portion of the display area on such client devices may still be unused, or if the present invention is not employed, display of all of the content may require scrolling in more than one direction. For such client devices, selective loading and display of content modules in accord with the present invention can still be accomplished on initial content loading, although no client-side browser window resize-detection handler is required.

Figure 8A:
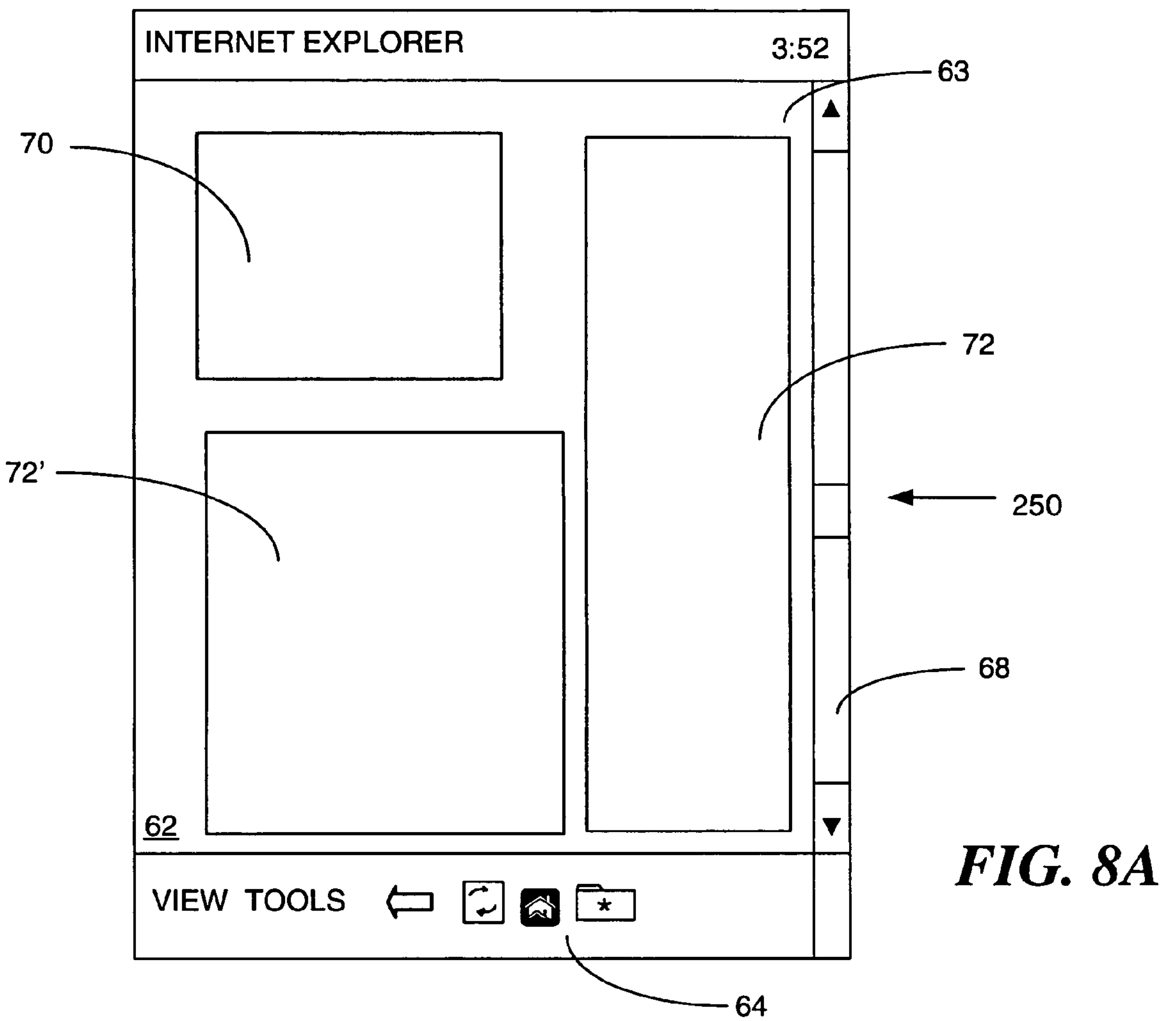
FIG. 8A is a representation of a browser window on a typical PDA with a plurality of content modules displayed.

FIG. 8A is a representation of a browser window 250 that might appear on a PDA, running Microsoft Corporation's POCKET INTERNET EXPLORER™ browser program. The browser window includes content display area 62, with additional available display area 63 remaining after primary content 70 is displayed. Just as explained above in connection with the larger browser windows employed on personal computers, the total display area on this PDA is limited by including tool bar 64 and any scroll bar 68 that is necessary for viewing content beyond what will fit at one time in content display area 62. However, browser window 250 can not be resized, so its content display area 62 is fixed and known. Nevertheless, a plurality of content modules, such as primary content 70 and additional content modules 72 and 72', can be selectively downloaded and displayed, based on the known browser window/display size.

Figure 8B:
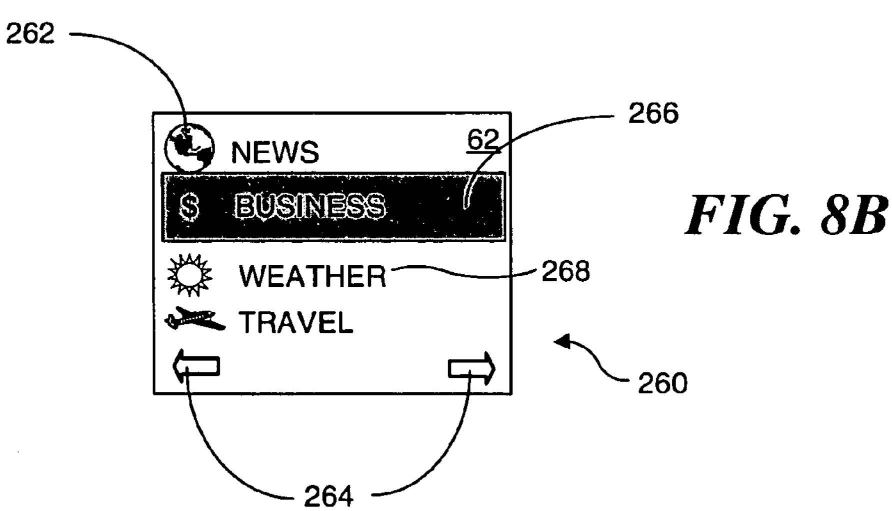
FIG. 8B is a representation of a browser window on a small cellular telephone with a plurality of content modules displayed.

FIG. 8B is a representation of a browser window 260 on a cellular telephone. Content display area 62 on this client device includes only text 268 and/or icons 262. Content display area 62 of small client devices like this cellular phone may also have scroll direction indicators 264 controlled by buttons (not shown). Such small client devices also often have an "Enter" button (not shown) to select a highlighted content item 266 on the display. A content item may comprise a URL hyper link to a Web page with additional detail about the content item, such as a list of parameters, information, or other data that can thus be selectively downloaded and displayed. For example, details and data relating to sports news, directions to a business, or other on-line services often must be scrolled into view. However, it will be apparent that selectively downloading and displaying only icons from a content document, without the text, will enable more content items to be displayed, and may also result in unused content display area being available.

Accordingly, yet another preferred embodiment of the present invention facilitates the download and display of selected portions of a content document as a function of content display area 62 in a browser window 260 (or full display area) on a client device. In this embodiment, the content that is downloaded to the client device might be an entire Web page if the client device is a personal computer, or may comprise a selected one or more content modules comprising the Web page if the client device that is detected is a cellular phone or other client device having a very small display.

Figure 9:
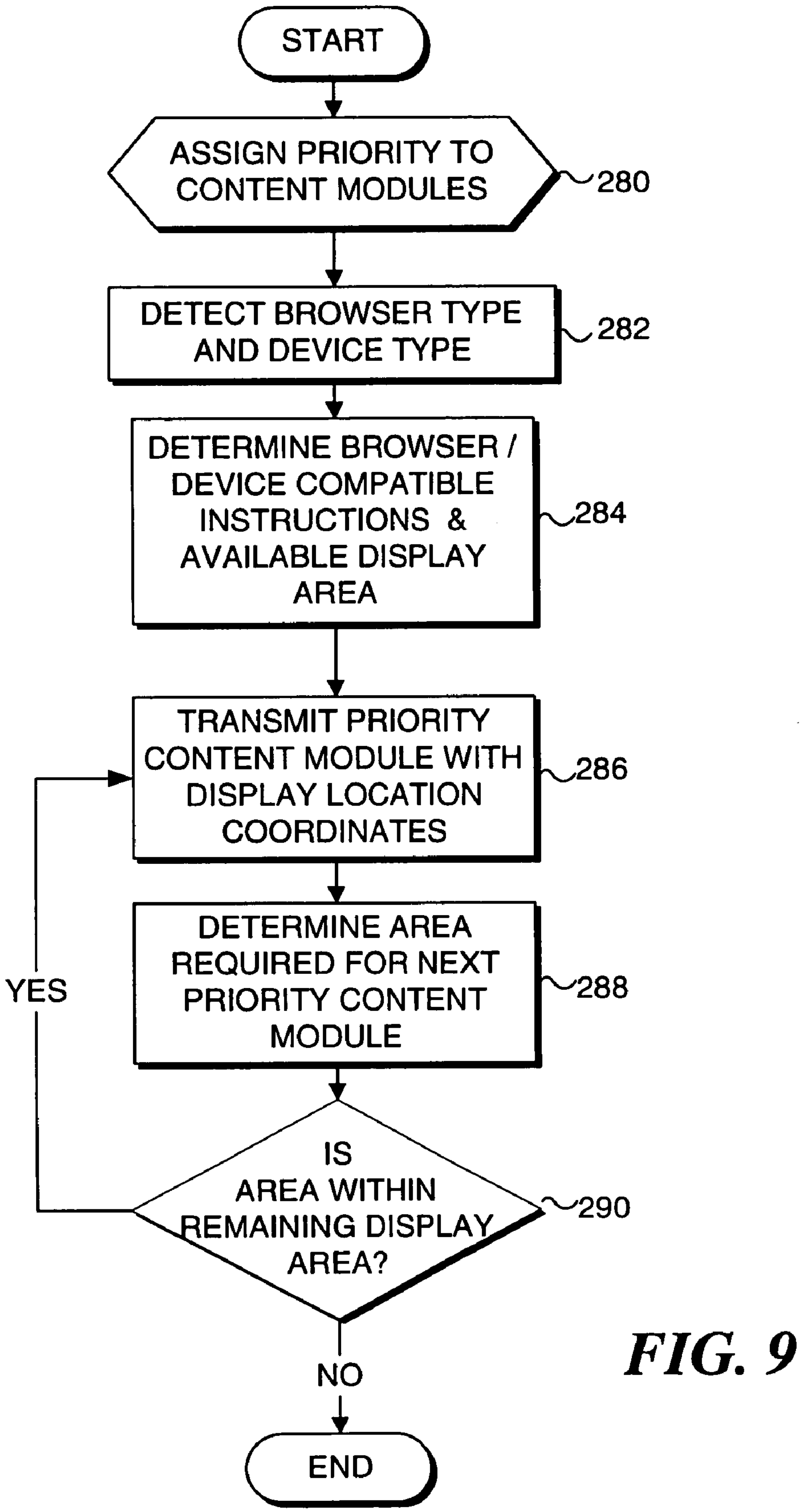
FIG. 9 is a flow diagram illustrating the logic used by the present invention to pre-select and display multiple content modules of a Web page based on a known display area and a priority of the content modules.

FIG. 9 illustrates the logic employed in this embodiment to selectively download and display one or more prioritized content modules. A priority is pre-assigned to each content module available for display of a full Web page, in a block 280. A content module may include only individual display elements, if desired. As in earlier embodiments, the type and version of the browser program executed on the client device are detected in a block 282, preferably from a user agent string included in a request header transmitted from the client device to a Web server. However, this step also detects the device type, preferably from the header. With this information, browser compatible instructions and the available display area are determined by the Web server control object in a block 284. As discussed above, the available content display area is determined based upon the known area of the requesting browser type and/or client display device. In a block 286, a priority content module is communicated to the browser program with associated browser location coordinates and other attributes, if any. In a preferred embodiment of this logic, determination of known available content display area and selection of priority content is done on Web server before any content module is communicated to the requesting browser program running on the client device. This step eliminates the need to dynamically detect the available contact display area via the browser program DOM. A block 288 determines the area for the next priority content module, preferably from the style attributes of that content module. Because the areas of each content module, and the available content display area are known, the remaining content display area can be computed on the Web server to determine whether the next lower priority content module will fit within the remaining display area, as indicated in a block 290. If so, then that next lower priority content module is transmitted to the browser program. These steps iterate until insufficient content display area remains to display any added content. This embodiment may also be readily adapted to send all selected content modules during one communication from the Web server to the browser program, instead of during iterative downloads.

As a specific example of the preceding embodiment, a Web designer can assign higher priority to icons than associated text, so that all icons are sent to a cellular telephone before text. Those skilled in the art will recognize that position attributes of the text content are not lost, because absolute or relative position attributes can be assigned separately to the text as well as to the icons. Thus, text would be included in the appropriate locations for larger browser windows, e.g., on a PDA, but not included for small browser windows on smaller client devices such as cellular telephones that don't have enough display area to accommodate the lower priority content text. Those skilled in the art will recognize that content can be selectively displayed based on size, or other attributes in addition to, or instead of priority. In any case, icons and/or other content can be selectively downloaded and displayed as a function of the available display or browser window, without requiring a separate Web page document for each different size of client device or different size of browser window. Web clipping, or other proxy server content conversion is not required on the client device, because the content is already prioritized.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the present invention in any way be limited by the above description, but instead be determined entirely by reference to the claims that follow.

The invention in which an exclusive right is claimed is defined by the following:

1. A method for controlling content displayed as a single Web page on a device, where the device is incapable of displaying all available content, comprising the steps of:

(a) automatically determining an available display area for displaying the single Web page on the device;

(b) automatically determining a combination of different portions of the available content that can be fully displayed in the single Web page in the available display area without requiring scrolling in more than one direction and without requiring a modification of the different portions of the content that results in the different portions comprising the combination being perceived in less than their entirety on the single Web page; and (c) displaying only the combination of different portions of the content that were automatically determined to enable a user to discern all of the information that the combination of different portions of the content provides as fully displayed in the available display area, since the combination of different portions of the content does not employ a hyperlink to display the information it conveys, without requiring scrolling in more than one direction, and without requiring a modification of the combination of different portions of the content that results in the different portions of content comprising the combination being perceived in less than their entirety.

2. The method of claim 1, further comprising the step of dividing the Web page into discrete content modules that are selectively displayable.

3. The method of claim 1, wherein the step of determining the portion of the content that can be fully displayed in the available display area without requiring scrolling in more than one direction comprises the step of prioritizing different portions of the content based on an order of importance, said different portions of the content corresponding to specific areas of the Web page that are selectively displayed as a function of the available display area.

4. The method of claim 3, wherein the step of prioritizing comprises the step of ranking the different portions of the content according to their importance in conveying information on the Web page.

5. The method of claim 1, wherein the step of automatically determining the combination of different portions of the content that can be fully displayed in the available display area without requiring scrolling in more than one direction, comprises the steps of:

(a) detecting a respective share of the available display area required by each portion of the content; and (b) automatically determining a combination of different portions of the content that are displayable in the display area, based upon the respective share of the display area required by each different portion of the content.

6. The method of claim 5, wherein the step of automatically determining the combination of different portions of the content comprises at least one of the steps of:

(a) automatically changing a dimension of a portion of the content to fit the dimensions of the available display area;

(b) automatically scaling a portion of the content to fit the available display area;

(c) automatically changing an orientation of a portion of the content to fit the available display area;

(d) automatically converting a portion of the content into a moving image within the available display area; and (e) automatically subdividing a portion of the content into sub-portions that are displayed sequentially within the available display area.

* * * * *

UNITED STATES PATENT AND TRADEMARK OFFICE

CERTIFICATE OF CORRECTION

PATENT NO. : 6,983,331 B1
APPLICATION NO. : 09/691277
DATED : January 3, 2006
INVENTOR(S) : Syne Mitchell et al.

It is certified that error appears in the above-identified patent and that said Letters Patent is hereby corrected as shown below:

In column 2, line(s) 52-53, delete “Technoloy” and insert -- Technology --, therefor.

In column 11, line 4, delete “1118” and insert -- 118 --, therefor.

Signed and Sealed this

Eighth Day of September, 2009

David J. Kappos

David J. Kappos
*Director of the United States Patent and Trademark Office*